United States Patent

[11] 3,560,726

| [72] | Inventors | Walter A. Platt<br>Fair Lawn;<br>Harold Moreines, Springfield, N.J. |
|---|---|---|
| [21] | Appl. No. | 764,246 |
| [22] | Filed | Oct. 1, 1968 |
| [45] | Patented | Feb. 2, 1971 |
| [73] | Assignee | The Bendix Corporation<br>a corporation of Delaware |

[54] AC-DC FUNCTION GENERATORS USING STRAIGHT-LINE APPROXIMATION
14 Claims, 2 Drawing Figs.

[52] U.S. Cl. .................................................. 235/197,
307/229, 307/251
[51] Int. Cl. .................................................. G06g 7/28
[50] Field of Search .......................................... 235/197,
150.53, 183; 328/142; 307/229, 251

[56] References Cited
UNITED STATES PATENTS
3,059,853 10/1962 Davis ............................. 235/197

| 3,197,627 | 7/1965 | Lewis ........................ | 235/197 |
| 3,358,130 | 12/1967 | Miura et al. ................ | 235/197 |
| 3,413,456 | 11/1968 | Sutton ....................... | 235/197X |
| 3,414,737 | 12/1968 | Bowers, Jr. ................. | 307/251X |
| 3,436,559 | 4/1969 | Wavs .......................... | 307/229 |

Primary Examiner—Malcolm A. Morrison
Assistant Examiner—Joseph F. Ruggiero
Attorneys—S. H. Hartz and Plante, Hartz, Smith and Thompson ABSTRACT: An electronic circuit, for generating an AC or DC output voltage, that is an approximation of a prescribed function of an input voltage. The prescribed function being approximated by adding straight line segments, each characterized by a gating point and a slope. The segments are generated by segment generators having high gain direct coupled operational amplifiers and field effect transistors for introducing the segments at the proper gating points and series gain resistors to determine the slope of the segments. A summing amplifier adds the segments to form the prescribed function.

INVENTORS
WALTER A. PLATT
HAROLD MOREINES
BY
ATTORNEY 3,560,726

AC-DC FUNCTION GENERATORS USING STRAIGHT-LINE APPROXIMATION

BACKGROUND OF THE INVENTION

1. Field of the Invention

This invention relates to AC-DC function generators and more specifically to function generators using straight line segments to approximate a prescribed function.

2. Description of the Prior Art

Electronic generation of nonlinear functions is well known in the prior art. Raymond, U.S. Pat. No. 2,831,107 teaches the summation of straight lines to form a prescribed nonlinear function. The prior art devices use zener diodes or biased diodes with reference voltages for gating line segments. The diodes require high current signals and they do not gate accurately because of variations in characteristics and sensitivity to temperature changes. The use of diodes and transistors for gating circuits cause distortion of AC signals, because of their unidirectional characteristics; thereby limiting the prior art devices to DC applications. Transistors used for switching are also sensitive to power supply variations.

The present invention eliminates the difficulties of the prior art by using direct coupled operational amplifiers and field effect transistors for switching. Precise adjustment of the slope is achieved by use of precision resistors and the use of direct coupled operational amplifiers makes possible accurate gating. Amplifier gain is adjusted by resistors thereby controlling the sharpness of the gating point. The device is relatively immune to power supply variations since signals are never demodulated and then modulated.

SUMMARY OF THE INVENTION

The present invention contemplates a function generator operable with either AC or DC signals for generating an output voltage which is an approximation of a prescribed function of an input voltage. The function generator approximates the desired function by adding straight line segments each characterized by a gating point and a slope. Each segment is generated by a segment generator and the segments are combined by a summing amplifier to form the prescribed function. The slope of each segment is controlled by a series gain resistor and a direct coupled operational amplifier and the gating point of each segment is detected by direct coupled operational amplifiers and field effect transistor.

When the input voltage reaches the level exceeding a specified threshold voltage the output voltage of one of the operational amplifiers undergoes a phase reversal and is used to turn on a field effect transistor. The field effect transistor allows the input signal to pass through the series gain resistor to the summing amplifier.

The use of direct coupled operational amplifiers makes it possible to obtain extremely accurate gating points dependent only upon the variation in characteristics of precision resistors. The sharpness of the gating points is controllable eliminating distortion at the gating points. The use of field effect transistors provides for relatively distortion free AC operation because of their unique bidirectional characteristics.

One object of the invention is to provide a device which will generate both AC and DC functions.

Another object of the invention is to provide distortion free function generation.

Another object of the invention is to provide accurate gating points which are relatively free from variations in components, temperature and power supply.

Another object of the invention is to provide accurate slopes controlled only by precision resistors.

Another object of the invention is to provide controllable sharpness at the gating point to eliminate distortion.

The foregoing and other objects and advantages of the invention will appear more fully hereinafter from a consideration of the detailed description which follows, taken together with the accompanying drawings wherein one embodiment of the invention is illustrated by way of example.

DESCRIPTION OF THE INVENTION

Figure 1:
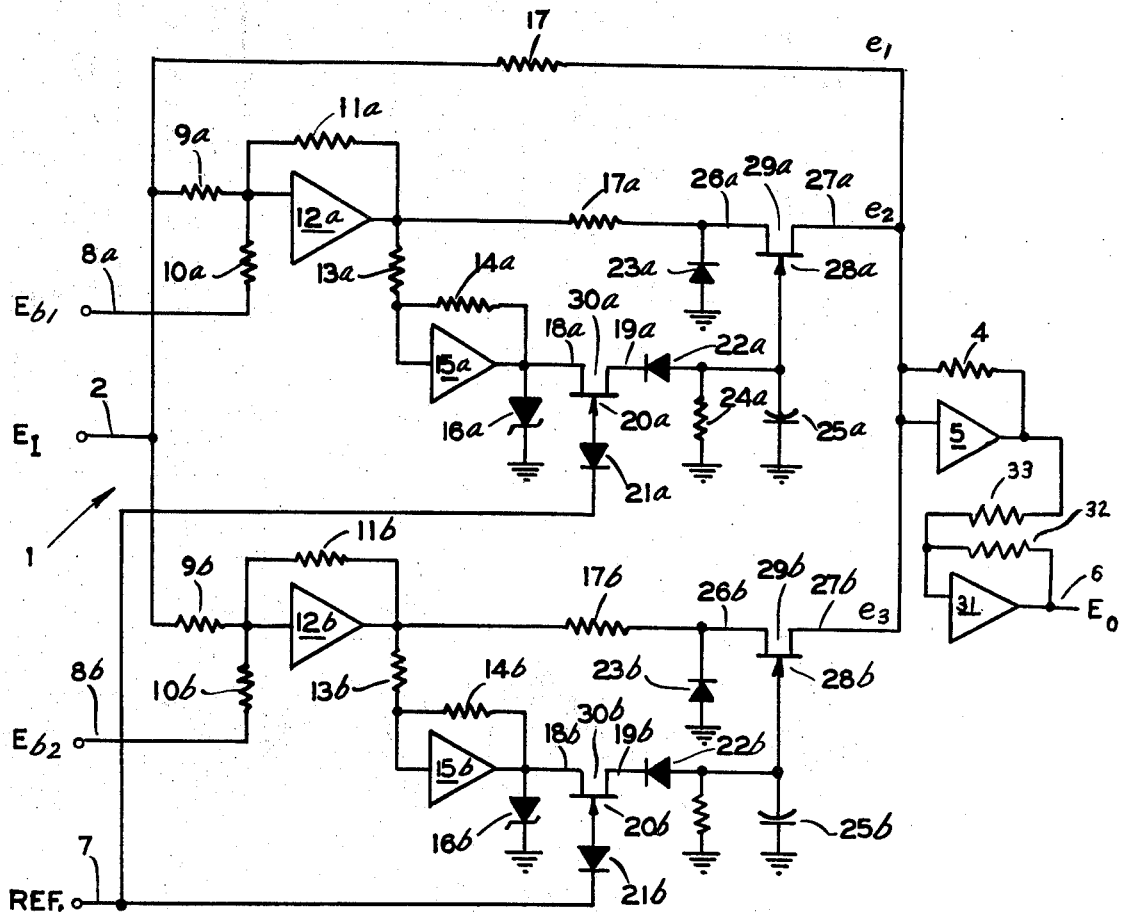
FIG. 1 is a schematic diagram of one embodiment of the present invention for generating a three segment approximation of a prescribed function of an input signal. Corresponding parts of the segment generators have been indicated by like numerals bearing the suffix $a$ or $b$ to indicate respective parts of each segment amplifier.
Figure 2:
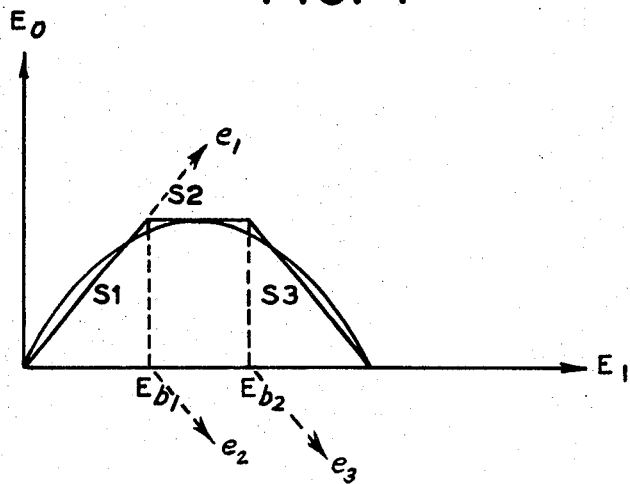
FIG. 2 illustrates the manner in which a prescribed function is approximated by straight line segments.

Referring to FIG. 1, there is shown a function generator 1 capable of generating three line segments $S_1$, $S_2$ and $S_3$, approximating the function shown in FIG. 2. While a three segment approximation is used to illustrate the invention it should be understood that the approximation can consist of any convenient number of straight line segments.

Input terminal 2 supplies an AC input signal $E_I$ for all three straight line segments.

The first segment $S_1$ begins at the origin of the coordinates of FIG. 2, namely at a zero input voltage $E_I$ and a zero output voltage $E_o$, and is formed by an output $e_1$ of a first segment generator having a resistor element 17 connected between input terminal 2 and the inverting input of a direct coupled operational amplifier 5 used as a summing amplifier. A feedback resistor 4 connects the output of summing amplifier 5 with the inverting input of a summing amplifier 5. The summing amplifier output appears as a voltage out of phase with the desired voltage $E_o$. The output of summing amplifier 5 is connected through a resistor 33 to the inverting input of a direct coupled operational amplifier 31 having a feedback resistor 32 connected between the output and the inverting input. Amplifier 31 inverts the output of amplifier 5 and provides the desired voltage $E_o$ to output terminal 6. The slope of the first segment $S_1$ in FIG. 2 is determined by the resistance ratio of the resistor elements 17 and 4.

A second segment generator provides an output $e_2$ which is added to $e_1$ to form segment $S_2$. The second segment generator has an input terminal 8a supplying an AC threshold voltage $E_{b_1}$, equal in magnitude to the gating voltage of the segment $S_2$ but out of phase with a square wave reference voltage supplied by a terminal 7. Terminal 8a is connected to an inverting input of a direct coupled operational amplifier 12a through a resistance element 10a. Input terminal 2 is also connected to the inverting input of a direct coupled operational amplifier 12a by a resistor element 9a. A resistor element 11a connects the output of amplifier 12a to the inverting input of amplifier 12a. The output of amplifier 12a is in phase with the reference voltage if signal $E_I$ is in phase with signal $E_{b_1}$ or out of phase and less than $E_{b_1}$, and the output of amplifier 12a is out of phase with the reference voltage when $E_I$ is out of phase and larger than $E_{b_1}$.

The output of amplifier 12a is connected to a source element 26a of a field effect transistor 29a through a series gain resistor 17a. A drain element 27a of the field effect transistor 29a is connected to the input of summing amplifier 5. Field effect transistor 29a is an N channel junction type field effect transistor which exhibits a high resistance between the source element 26a and the drain element 27a when a gate element 28a is at a certain potential lower than source element 26a. When the gate 28a is open or has a zero or positive voltage with respect to the source element 26a the resistance between the source element 26a and drain element 27a is relatively low, that is approximately 100 ohms. A diode element 23a has its cathode connected to source element 26a of field effect transistor 29a and its anode connected to ground. The diode 23a is used to limit the negative source element voltage at approximately −0.7 volts to prevent unwanted turn on of the field effect transistor 29a when the output of amplifier 12a goes negative. The output of direct coupled operational amplifier 12a is also connected to an inverting input of a high gain direct coupled operational amplifier 15a through a resistive element 13a. A feedback resistor 14a connects the output of amplifier 15a to its inverting input. A zener diode 16a has its cathode connected to ground and the anode connected to the output of amplifier 15a. The zener diode 16a limits the amplifier positive output to approximately 0.7 volts and also limits the negative output to some convenient voltage. The output of amplifier 15a is connected to a source element 18a of a field effect transistor 30a. A drain element 19a of field effect transistor 30a is connected to the cathode of a diode element 22a. The anode of diode element 22a is connected to a resistive element 24a, a capacitive element 25a and the gate element 28a of field effect transistor 29a. Diode element 22a prevents capacitive element 25a from charging positive and only allows a negative voltage to develop. Resistor element 24a is used to provide a discharge path for capacitive element 25a. A gate element 20a of field effect transistor 30a is connected to the anode of a diode 21a. Terminal 7, supplying the square wave reference voltage, is connected to the cathode of diode 21a which blocks the positive half cycles and only allows the negative half cycles to reach gate element 20a. Field effect transistor 30a has a high resistance between the source element 18a and drain element 19a when gate element 20a is at a certain voltage lower than source element 18a. The amplitude of the square wave reference voltage is sufficient to assure that the field effect transistor 30a will never conduct during a negative half cycle. When gate element 20a is open or has a zero or positive potential with respect to source element 18a the resistance between source element 18a and drain element 19a is relatively low, this is approximately 100 ohms. Field effect transistor 30a will conduct only when the gate element 20a is open or has a zero or higher potential than source element 18a. During the positive half cycle the reference voltage is blocked by diode 21a therefore gate 20a is a zero potential and field effect transistor 30a conducts when the voltage on the source element 18a is in the negative half cycle, thereby only passing amplifier 15a output if it is out of phase with the reference voltage. Amplifier 15a output is out of phase with the reference voltage only when voltage $E_I$ is in phase with signal $E_{b_1}$ or out of phase and less than $E_{b_1}$; this condition exists when input signal $E_I$ has not yet reached the segment $S_2$ gating point. Only the negative half cycles of amplifier 15a output can be conducted through diode 29a to have a high resistance and not pass signal $E_I$. When input signal $E_I$ is out of phase and larger than $E_{b_1}$, a condition existing when signal $E_I$ has reached the segment $S_2$ gating point, output of amplifier 15a is in phase with the reference voltage and is blocked by field effect transistor 30a or diode 22a. Capacitor 25a is not charged and field effect transistor 29a passes the output of amplifier 12a through resistive element 17a to the input of amplifier 5.

Summing amplifier 5 combines the output $e_2$ of the second segment generator with $e_1$ from the first segment generator to form segment $S_2$. The slope of segment $S_2$ is determined by the resistance ratio of resistive elements 4 and 17a and the slope of segment $S_1$.

Segment $S_3$ is formed in a like manner when the input voltage $E_I$ is out of phase and larger than an AC voltage $E_{b_2}$ supplied by a terminal 8b. $E_{b_2}$ is equal in magnitude to the gating voltage of segment $S_3$ but out of phase with the reference voltage. The slope segment $S_3$ is determined by the resistance ratio of resistance elements 4 and 17b and the slopes of segments $S_1$ and $S_2$.

Thus the desired output function is approximated by three straight line segments $S_1$, $S_2$, and $S_3$ as shown in FIG. 2. The gating points of segments $S_2$ and $S_3$ are accurately controlled by the threshold voltages $E_{b_1}$ and $E_{b_2}$ and the incremental input voltage needed for gating is inversely proportional to the gain of amplifier 15a.

If it is desirable that the slope of a segment increase relative to a prior segment the noninverting inputs of the direct coupled operational amplifiers in the segment generator are used instead of the inverting inputs. This allows the segment generator to pass an in phase signal to the summing amplifier, thereby adding to the prior segment causing an increasing slope.

The invention becomes operative with DC signals by using DC threshold voltages for $E_{b_1}$ and $E_{b_2}$ and a zero or positive DC voltage for the reference voltage.

If only DC signals are required the circuit can be simplified by eliminating the reference voltage and components 21a, 21b, 24a, 24b, 25a, 25b, 30a and 30b and connecting the output of amplifiers 15a and 15b to gate elements 28a and 28b through diodes 22a and 22b respectively.

If it is desirable that the prescribed function not pass through the origin of the coordinates in FIG. 2, the function can be offset to give a zero output voltage until the input voltage reaches a specified gating voltage. This can be accomplished by replacing resistor 17 with a segment generator similar to those used for segments $S_2$ and $S_3$ having a threshold voltage equal in magnitude to the desired gating voltage but out of phase with the reference voltage.

We claim:

1. An electronic function generator for approximating a prescribed function of an input voltage by generating a plurality of straight line segments having specific gating points and slopes comprising:
   a plurality of segment generators for generating the straight line segments, the segment generators including threshold voltage sources providing threshold voltages, operational amplifier means responsive to the input voltage and threshold voltages and providing outputs, gating means connected to the operational amplifier means for gating the operational amplified means outputs at the gating points, and impedance means connected between the operational amplifier means and the gating means for determining the slopes of the segments; and
   summing means connected to the segment generators for combining the straight line segments to provide the prescribed function.

2. An electronic function generator as described in claim 1, in which the operational amplifier means has means for reversing the phase of the outputs at the segment gating points.

3. An electronic function generator as described in claim 2, in which the gating means includes means for detecting the phase reversal of the outputs.

4. An electronic function generator as described in claim 1, in which:
   the threshold voltages correspond to the segment gating points;
   the operational amplifier means provides outputs which reverse phase at the threshold voltages;
   gating means includes means for detecting the phase reversal of the outputs; and
   the impedance means includes gain resistors.

5. An electronic function generator as described in claim 1, additionally comprising a resistor connecting the input voltage to the summing means for determining the slope of a segment having a gating point of zero input voltage.

6. An electronic function generator as defined in claim 1, in which the summing means includes an operational amplifier.

7. An electronic function generator as described in claim 1, in which each gating means comprises:
   a gating device connected to the impedance means for gating the operational amplifier means output; and
   control means connected to the operational amplifier means and responsive to the operational amplifier means output for controlling the gating device.

8. An electronic function generator as described in claim 7, in which the gating device includes a bidirectional gating element.

9. An electronic function generator as described in claim 8, in which the bidirectional gating element comprises a field effect transistor.

10. An electronic function generator as described in claim 7 in which each control means includes:
   an operational amplifier connected to the operational amplifier means for receiving and amplifying the output therefrom;
   a reference signal source providing a reference signal; and a field effect transistor connected between the operational amplifier and the gating device and responsive to the output of the operational amplifier and the reference signal for controlling the gating device.

11. An electronic function generator as defined in claim 10, in which the summing means includes an operational amplifier.

12. An electronic function generator as described in claim 10, additionally comprising a resistor connecting the input voltage to the summing means for determining the slope of a segment having a gating point at zero input voltage.

13. An AC-DC function generator for providing a voltage that approximates a prescribed function of an input voltage by the use of a plurality of straight line segments each having a specific gating point and slope, comprising:
   a plurality of segment generators each for providing an output voltage that varies linearly with the input voltage when the input equals or exceeds a specific gating point, each segment generator includes a threshold voltage source providing a threshold voltage corresponding to a gating point, operational amplifier means responsive to the input and threshold voltage for providing an output voltage that varies linearly with the input voltage and is at a zero level when the input voltage equals the threshold voltage, gating means for gating the output voltage when the input voltage equals or exceeds the threshold voltage, and impedance means connected between the operational means and the gating means for alternating the output voltage; and
   summing means connected to the segment generators for summing the output voltages to provide an approximation of the prescribed function.

14. A device as described in claim 13, wherein the gating means comprises:
   a first field effect transistor connecting the impedance means to the summing means:
   an operational amplified connected to the operational amplifier means for receiving the output voltage therefrom and having an output providing a signal the phase of which varies in response to the output voltage of the operational amplifier means:
   a second field effect transistor connecting the operational amplifier output signal to the first field effect transistor; and
   a reference signal source connected to the second field effect transistor and providing a reference signal thereto, said second field effect transistor being responsive to the relative phase of the reference signal and the operational amplifier output signal for passing the operational amplifier output signal to the first field effect transistor which is controlled thereby for passing the output voltage when the input voltage equals or exceeds the threshold voltage.